US012741488B2

(12) United States Patent
Gurumoorthy et al.

(10) Patent No.: US 12,741,488 B2
(45) Date of Patent: Sep. 22, 2026

(54) PNEUMATIC TIRE WITH GROOVE

(71) Applicant: Apollo Tyres Ltd., Tamil Nadu (IN)

(72) Inventors: Vijai Karthik Gurumoorthy, Tamilnadu (IN); Saraj Vijayakumaran Nair Sreekumari, Kerala (IN)

(73) Assignee: Apollo Tyres Ltd., Tamil Nadu (IN)

(*) Notice: Subject to any disclaimer, the term of this patent is extended or adjusted under 35 U.S.C. 154(b) by 0 days.

(21) Appl. No.: 17/958,313

(22) Filed: Sep. 30, 2022

(65) Prior Publication Data

US 2024/0109372 A1 Apr. 4, 2024

(51) Int. Cl.
*B60C 11/03* (2006.01)
*B60C 11/01* (2006.01)
*B60C 11/13* (2006.01)

(52) U.S. Cl.
CPC ......... *B60C 11/01* (2013.01); *B60C 2011/013* (2013.01); *B60C 2011/0341* (2013.01); *B60C 2011/036* (2013.01); *B60C 2011/0397* (2013.01); *B60C 2011/133* (2013.01)

(58) Field of Classification Search
CPC ............. B60C 2011/0397; B60C 11/01; B60C 2011/133; B60C 2011/0348
See application file for complete search history.

(56) References Cited

U.S. PATENT DOCUMENTS 5,921,303 A * 7/1999 Matsumoto ............. B60C 11/01 152/209.27
2009/0065115 A1* 3/2009 Mathews ................ B60C 11/12 152/209.16
2010/0096060 A1* 4/2010 Suzuki .................... B60C 11/01 152/531
2010/0122759 A1* 5/2010 Sakaguchi ............. B60C 11/01 152/209.16
2019/0184756 A1 6/2019 Ohta
2020/0361247 A1* 11/2020 Suita ...................... B60C 11/01

FOREIGN PATENT DOCUMENTS

KR 2003-0050417 * 6/2003

OTHER PUBLICATIONS

KR 2003-0050417 Machine Translation, Kim, Gyeong Hyeon (Year: 2003).*

* cited by examiner

*Primary Examiner* — Katelyn W Smith
*Assistant Examiner* — Nicholas J Weiler
(74) *Attorney, Agent, or Firm* — Renner, Otto, Boisselle & Sklar, LLP

(57) ABSTRACT

A tire comprising a tread portion for contacting the ground and a pair of opposing sidewall portions, the tread portion extending between a pair of shoulders and having an equatorial region in between, the sidewall portions extending essentially in a radial direction from the shoulders, wherein the tread portion comprises next to the shoulder at least one circumferential groove forming a recessed rib, the recessed rib located on the side of the circumferential groove farther away from the equatorial region, said groove has adjacent groove walls with a first groove wall facing away from the equatorial region and a second groove wall facing towards the equatorial region, the second groove wall comprises a protruding portion protruding outwardly away from the equatorial region comprising two diverging regions and in between the diverging regions a non-diverging region, the diverging region on the second groove wall is non-parallel to the first groove wall.

11 Claims, 6 Drawing Sheets

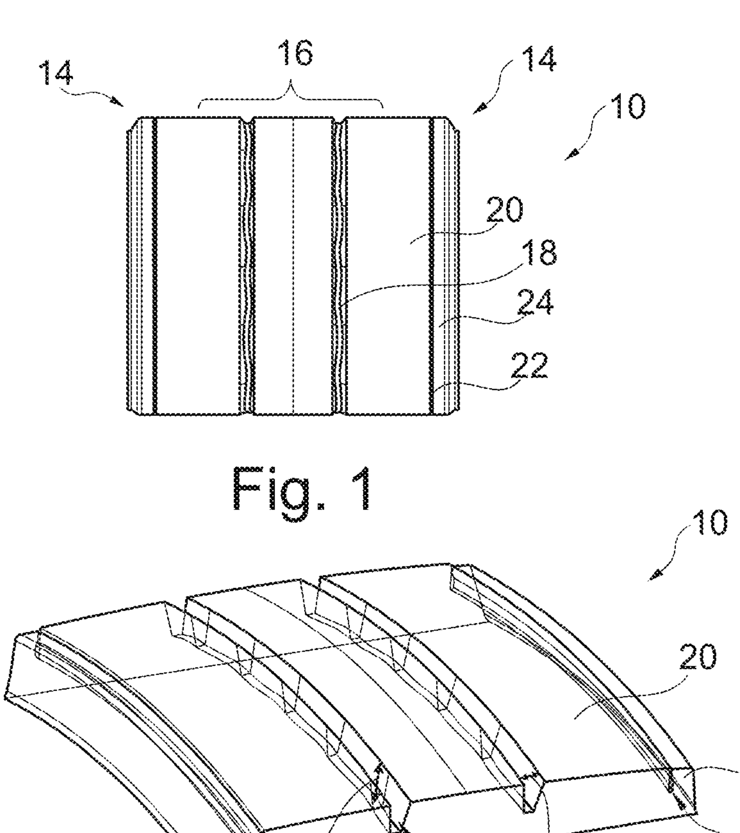
Fig. 1
Fig. 2
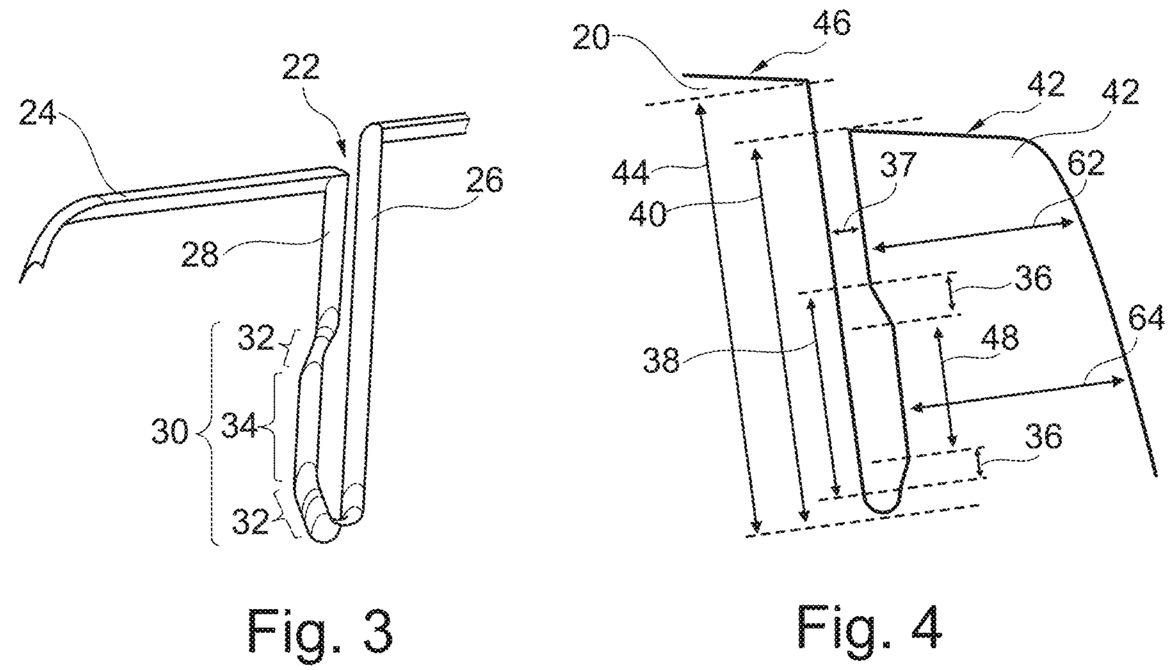
Fig. 3
Fig. 4

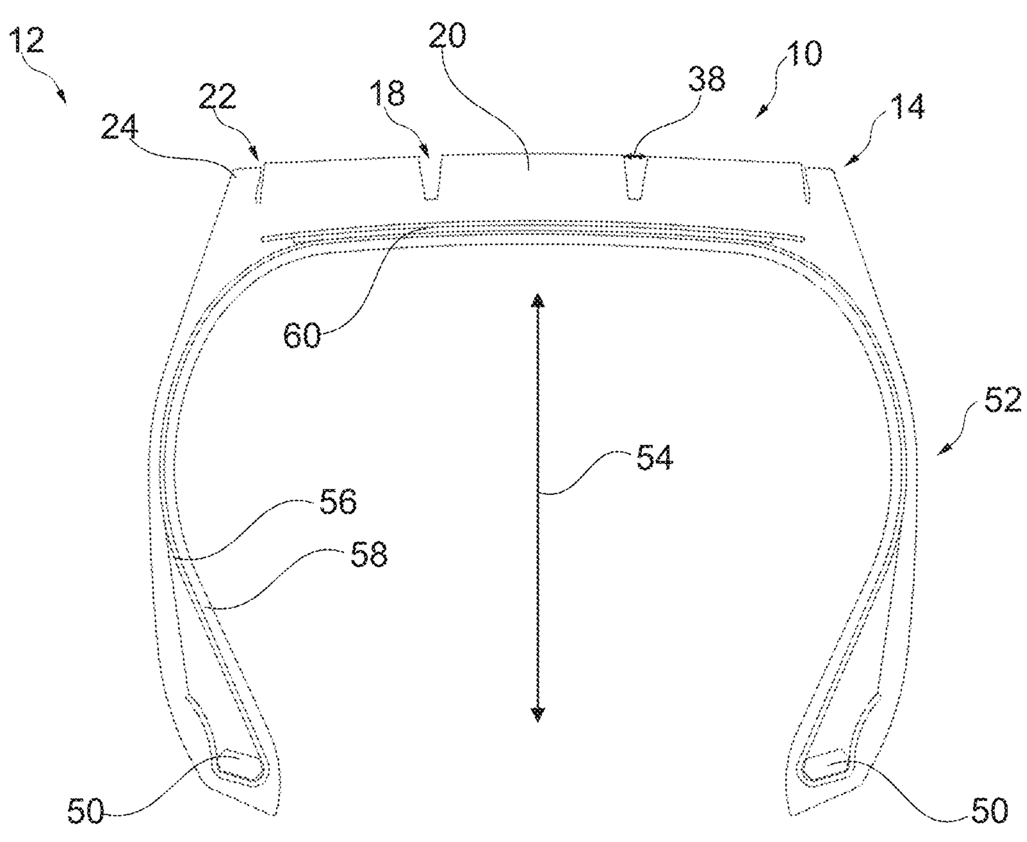
Fig. 5
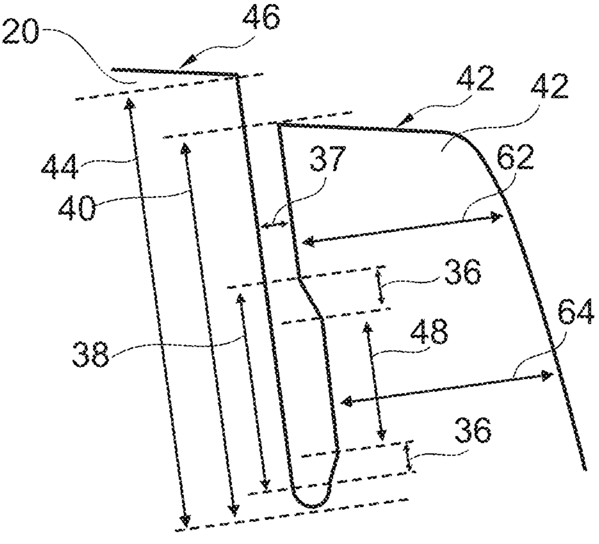
Fig. 6

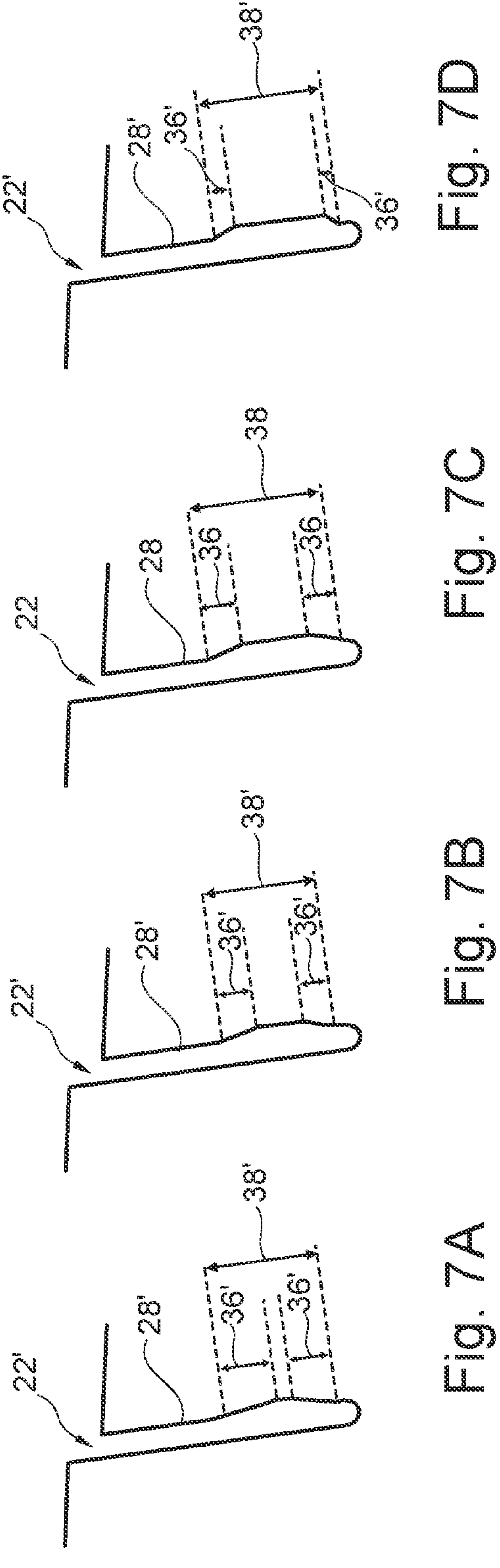
22'
28'
36'
38'
36'
Fig. 7A
22'
28'
36'
38'
36'
Fig. 7B
22
28
36
38
36
Fig. 7C
22'
28'
36'
38'
36'
Fig. 7D

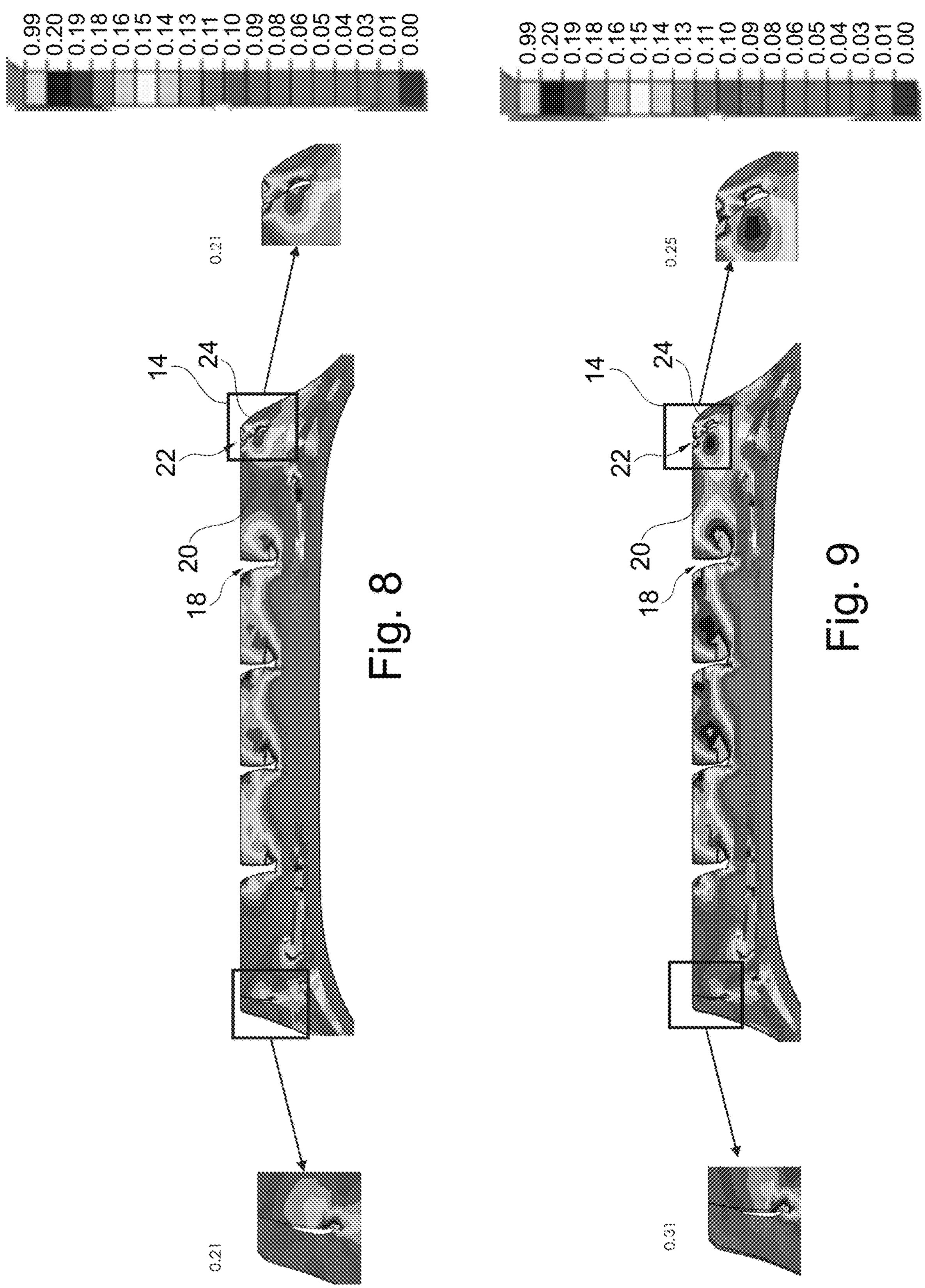
Fig. 8
Fig. 9

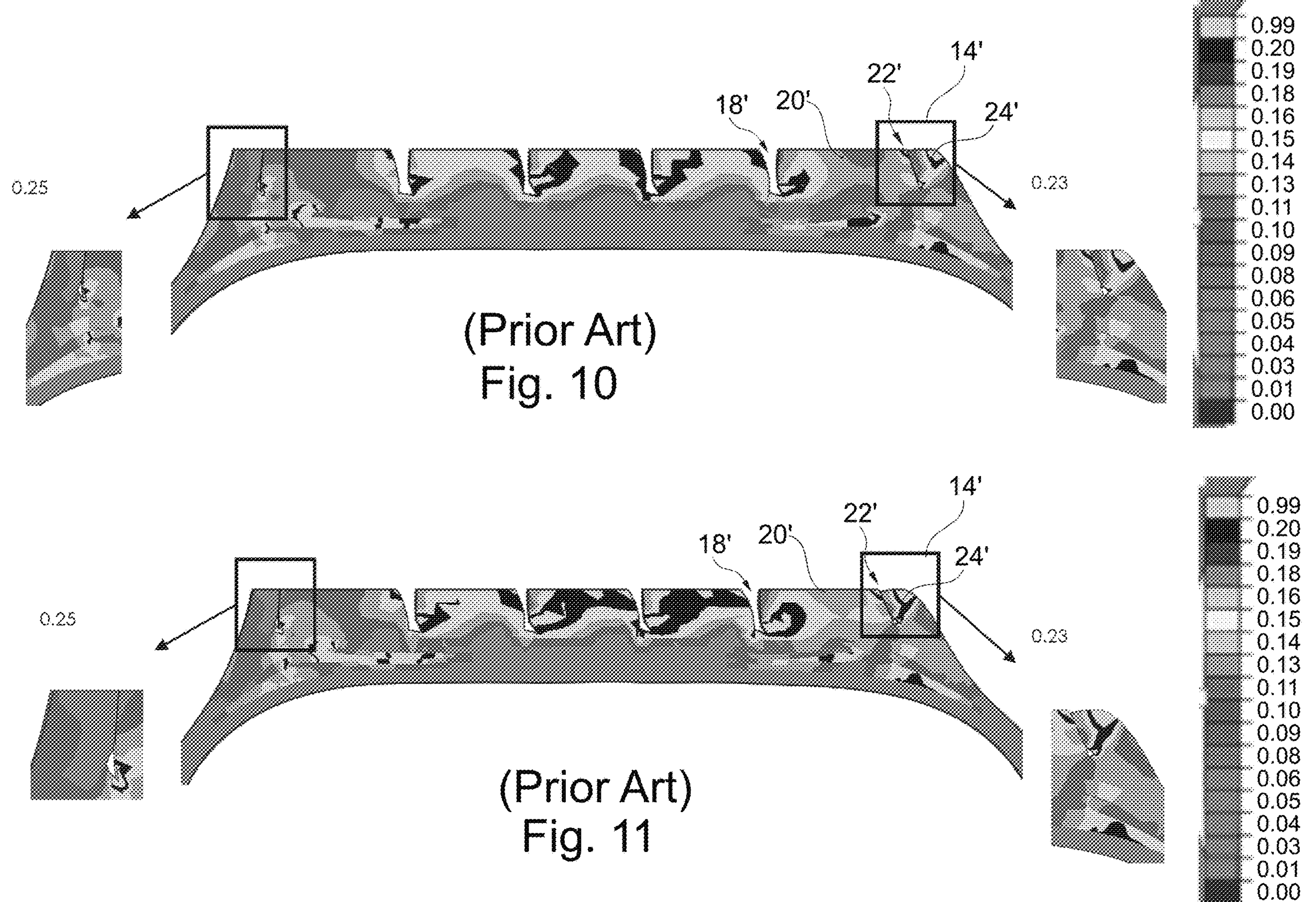
(Prior Art)
Fig. 10
(Prior Art)
Fig. 11

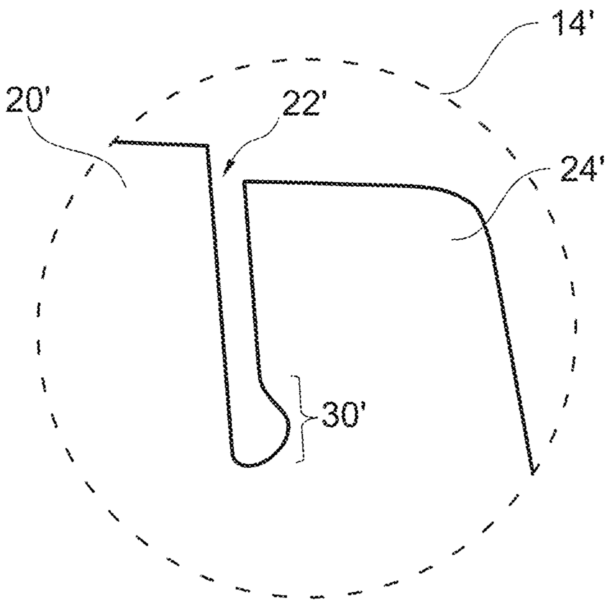
(Prior Art)
Fig. 12

PNEUMATIC TIRE WITH GROOVE

FIELD OF THE INVENTION

The present invention relates to a tire of vehicle having a tread portion with a groove for enhancing the durability and lifetime of the tire. The present invention further relates to a corresponding wheel, and to a tire mold for molding the above tire.

BACKGROUND OF THE INVENTION

Tires are meant for commuting purpose, carrying tons of load, and are subjected to varying speed operation, road conditions, and driver expertise. In particular pneumatic truck tires on the front and trailer axle tend to wear irregularly, causing tread delamination in particular on the shoulder region of the tire. This leads to a premature replacement of the tire, even though the tire ha non-utilized tread.

A potential approach to decrease irregular wear is for instance described in US 2019/0184756 A1. This document describes a tire comprises a tread portion with at least one main groove extending in a circumferential direction around the tire, forming at least one main rib on the tread portion. To suppress uneven wear, the shoulder comprises a circumferential groove, which is also called defense groove or decouple groove, such that the groove forms an additional rib on the shoulder. The groove aims to prevent eccentric wear that starts to appear on an outer side of the shoulder from developing.

However, even though the groove can help decrease uneven wear, the durability and thus the lifetime of the tire are still an issue. Due to the force of the tire when the tire rolls on the road microcracks can occur in the bottom of the groove, which in turn can lead to tearing. Furthermore, small stones can intrude the groove, and can even be trapped inside the groove which further leads to a damaging of the groove and thus affects the structural integrity of the tire.

There is a permanent need for providing a tire with a high durability and lifetime.

The present invention has the objective to provide a tire with an improved durability and lifetime. A further objective is to prevent microcracks from occurring in the groove and further to prevent trapping of stones inside the groove.

SUMMARY OF THE INVENTION

In a first aspect, the invention provides a tire comprising a tread portion for contacting the ground and a pair of opposing sidewall portions, the tread portion extending between a pair of shoulders and having an equatorial region in between, the sidewall portions extending essentially in a radial direction from the shoulders, wherein the tread portion comprises next to the shoulder at least one circumferential groove forming a recessed rib, the recessed rib located on the side of the circumferential groove farther away from the equatorial region, wherein said groove has adjacent groove walls with a first groove wall facing away from the equatorial region and a second groove wall facing towards the equatorial region, wherein the second groove wall comprises a protruding portion protruding outwardly away from the equatorial region, the protruding portion comprising two diverging regions and in between the diverging regions a non-diverging region, wherein the diverging region on the second groove wall is non-parallel to the first groove wall, and wherein the non-diverging region on the second groove wall is essentially parallel to the first groove wall, and wherein a sum of a radial extension of the diverging regions is in between 25% to 45% of the radial extension of the protruding portion.

By forming the groove next to the shoulder and forming the recessed rib, the rigidity of the shoulder is lessened leading to a controlled wear of the tire. The groove "decouples" the forces pushing down the sidewall portions of the tire from the lateral forces experienced during steering maneuvers from the tread portion in contact with the road surface. Hence, excessive lateral movements between the road surface and the recessed rib are reduced.

Furthermore, by providing the protruding portion on the second groove wall, i.e. the groove wall connecting the groove to the recessed rib, a concentration of strain on the groove bottom is relieved thereby suppressing the occurrence of microcracks in the groove bottom. Thus, the durability of the tire is increased. As the protruding portion is formed in the second groove wall facing away from the equatorial region and due to the specific form of the protruding portion, where the sum of the radial extension of the diverging regions is in between 25% to 45% of the radial extension of the protruding portion, a favorable strain distribution is achieved, in particular during cornering, where the concentration of strain in the second groove wall of the groove is lowered. Thus, tearing of the recessed rib is prevented and durability of the tire is increased.

Furthermore, the form of the groove also helps preventing that stones intrude the groove and/or are trapped in the groove. The protruding portion has the effect that a width of the groove varies, such that the width of the groove within the protruding portion is higher than outside the protruding portion, and in particular higher than at an opening of the groove. The smaller width of the groove near the opening helps to avoid that stones intrude the groove. Furthermore, as the radial extension of the non-diverging region in the protruding portion, where the second groove wall is essentially parallel to the first groove wall, is preferably less than 55% of the radial extension of the protruding portion, stones are prevented from being trapped on the bottom of the groove, causing damage to the groove walls. Hence, the lifetime of the tire is increased.

In summary the specific form of the groove increases stone trapping resistance, decreases the likelihood that the recessed rip tears and prevents microcracks from occurring at the groove bottom, thus leading to a tire having an improved durability and lifetime.

As the groove extents circumferentially around the tire, the radial extension of the groove corresponds to the depth of the groove. Preferably the radial extension of the groove is determined from an exterior surface of the recessed rib facing in the radial direction of the tire, along a shortest line towards the bottom of the groove. Preferably at the beginning of the lifetime of the tire the groove has a radial extension of 60% to 120% of a non-skid depth (NSD) of the tread portion. Further preferably at the beginning of the lifetime of the tire the groove has a radial extension of 80% to 100% and more preferably of 85% to 95% of the NSD. For example, the groove may have a radial extension of 90% of the NSD of the tread portion.

As already mentioned, the groove comprises the first and second groove wall. The first groove wall is the groove wall facing away from the equatorial region, meaning that a normal vector of the first groove wall pointing towards the free volume of the groove also points away from the equatorial region. The second groove wall is opposite the first groove wall and faces towards the equatorial region. The second groove wall is preferably over its entire surface not always parallel to the first groove wall. Instead, it comprises the protruding portion with its non-diverging region, where the second groove wall is not parallel to the first groove wall. Furthermore, concerning the circumferential extent of the groove, the protruding portion is preferably not a local protruding portion, but extends circumferentially along the entire groove.

With regard to the radial extension of the protruding portion, the radial extension of the diverging region and the radial extension of the non-diverging region, these are preferably measured parallel to the radial extension of the groove.

With regard to the recessed rib, being recessed preferably also means that the radial extension of the second groove wall determined from the exterior surface of the recessed rib facing in the radial direction of the tire is less than a radial extension of the first groove wall determined from the tread surface facing in the radial direction of the tire. Furthermore, as the radial extension of the groove is preferably determined from the exterior surface of the recessed rib facing in the radial direction of the tire, the radial extension of the second groove wall preferably corresponds to the radial extension of the groove.

Preferably the first groove wall is free of a protruding portion. In particular, the first groove wall is preferably formed by an even plain. In other words, in a cross section of the groove the first groove wall has the form of a straight line. As the first groove wall facing away from the equatorial region does preferably not comprise a protruding portion, the stability of the first groove wall is not affected. This helps to achieve an even pressure distribution and thus an even wear of the tire.

Furthermore, the term "tire" preferably means all types of elastic bandages subjected to internal pressure or not. The tire is preferably a pneumatic tire. Further preferably the tire is configured as a heavy-duty tire in particular a tire suitable for a vehicle carrying heavy loads, such as for example a truck tire or a bus tire. The tire preferably comprises, a pair of opposing bead portions, a carcass and at least one reinforcing ply, the sidewall portions extending essentially in a radial direction from the bead portion, the carcass extending between the pair of bead portions, and the reinforcing ply being sandwiched between the tread portion and the carcass. Further preferably an inner liner for holding air pressure is arrange on an inner side of the carcass.

The tread portion of the tire is preferably formed by a quantity of rubber material delimited by the sidewall portions an is intended to come into contact with an underground when the tire is rolling.

The term "groove" means an elongated void area in the tire that may extend longitudinally or circumferentially or may extend laterally about the tread portion in a straight, curved, wavy, stepped or zigzag manner. Grooves may be of varying depths in a tire. As used herein, the term "circumferential groove" refers to a continuous longitudinal groove which is oriented in the circumferential direction of the tire.

The circumferential direction of the tire is preferably the direction along the tire rolling movement. As used herein, the terms "radial direction", "radial extension" and/or "radially" refer to a direction orthogonal to the circumferential direction and can either mean towards an axis of rotation of the tire or away from the axis of rotation.

In preferred embodiment of the invention, a tire is provided wherein a surface area of the first groove wall is less than a surface area of the second groove wall. In other words, the surface area of the groove wall facing away from the equatorial region has lesser surface area than the groove wall facing towards the equatorial region. On one hand, the lesser surface area of the first groove wall helps to maintain the stability of the tread portion and in particular the stability of a main rib of the tread portion adjacent to the groove. On the other hand, the higher surface area of the second groove wall—which is also the groove wall that is connected to the recessed rib—enables to control the shuffling of the recessed rib during cornering. The higher surface area of the second groove wall further leads to an increased transmission of heat thereby protecting exfoliation of the recessed rib.

With regard to the recessed rib and according to another preferred embodiment of the invention, a tire is provided, wherein the recessed rib has a radially outer width and a radially inner width, and wherein the radially outer width is greater than the radially inner width. In other words, the course of a lateral outer surface of the recessed rib, where the recessed rib is connected to the sidewall of the tire, and the course of the second groove wall is such that the width of the recessed rib differs along the radial direction of the tire. In particular the width at a radially outer position—which is also a position in closer to an opening of the groove—is greater than the width of the recessed rip at a radially inner position—which is also a position deeper inside the groove. The different width of the recessed rib ensures that a pressure distribution in the tire is uniform and thus helps to provide a tire having an even wear characteristic.

According to another preferred embodiment of the invention, a tire is provided, wherein a direction of the radial extension of the groove is essentially parallel to a lateral outer surface of the recessed rib facing away from the equatorial region. Further preferably the first groove wall is essentially parallel to the lateral outer surface of the recessed rib. In other words, the course of the first groove wall essentially matches the course of the lateral outer surface of the recessed rib. In particular in case the lateral outer surface of the recessed rib is inclined with respect to the radial direction of the tire, also the first groove wall is inclined with respect to the radial direction of the tire.

With regard to the bottom of the groove and according to another preferred embodiment of the invention a form of the bottom of the groove comprises a circular arc. It is preferred that the bottom of the groove is not formed by a straight line connecting the first and second groove wall, but by a circular arc. This has the advantage that the occurrence of microcracks in the bottom is even less likely. Furthermore, preferably a radius of the circular arc is preferably substantially equal to a radius of a circle being enclosed by the first and second groove wall in an upper portion of the groove, right at the opening of the groove. In other words, a width of the groove on the bottom is preferably substantially equal to a width of the groove at the opening of the groove.

According to another preferred embodiment of the invention, a tire is provided, wherein the radial extension of the protruding portion is in between 50% to 70% of the radial extension of the second groove wall, and preferably in between 55% to 65% of the radial extension of the second groove wall. This preferably also means that with regard to the second groove wall, about 30% to 50% and further preferably about 35% to 45% of the radial extension of the second groove wall do not lie within the protruding portion. Preferably in the region outside the protruding portion, and in particular in the region above the protruding portion near the opening of the groove, the second groove wall is substantially parallel to the first groove wall.

According to another preferred embodiment of the invention, a tire is provided, wherein the sum of the radial extension of the diverging region of the protruding portion is in between 13% to 25% of the radial extension of the first groove wall. In other words, 13% to 25% of first groove wall are opposite to the diverging regions of the protruding portion.

In principle, it is possible that the protruding portion of the second groove wall is realized close to the opening of the groove. However, according to a preferred embodiment of the invention it is preferred that the protruding portion of the second groove wall is realized close to the bottom of the groove. In this regard and according to a preferred embodiment of the invention, a tire is provided wherein the protruding portion a) starts at a radial position of 30% to 50% of the radial extension of the second groove wall, preferably at a radial position of 35% to 45% of the radial extension of the second groove wall, or
b) ends at a radial position of 80% to 100% of the radial extension of the second groove wall, preferably ends at a radial position of 85% to 95% of the radial extension of the second groove wall, or
c) a combination of a) and b).

With regard to starting and ending of the protruding portion, it is defined that the opening of the groove is considered 0% of the radial extension of the second groove wall and the bottom of the groove is considered 100% of the radial extension of the second groove wall. The realization of the protruding portion closer to the bottom of the groove leads to a higher lifetime of the tire as the beneficial effect of the protruding portion on the strain distribution are also present in a state where the tread of the tire as decreased due to wear. In particular it is preferred that the protruding portion is located within the groove at a radial extension, such that when the tread portion is worn 50% with regard to the NSD, the protruding portion would be at the opening of the groove.

According to another preferred embodiment the tread portion comprises at least one main groove next to the circumferential groove, forming a main rib located on the side of the circumferential groove closer to the equatorial region. Particular preferably the tread portion comprises more than one main groove and also more than one main rib. Further preferably at least one main rib is directly next to the recessed rib and separated from the recessed rib by the circumferential groove. Further preferably the radial extension of the main groove is greater than the radial extension of the circumferential groove, determined from the tread surface of the main rib facing in the radial direction of the tire. The main grooves and the main ribs preferably ensure a good grip of the tread portion.

The main groove and the groove are preferably parallel to each other. Further preferably, the width of the groove is preferably 5% to 19% of a width of the main groove. With regard to the width of the main groove, and as the main groove can have a conical shape, the width of the main groove is measured at the surface of the tread portion. In other words, the main groove is wider compared to the groove. Further preferably the recessed rib compared to the main rib is recessed from 8% to 18% with respect to a radial extension of the main groove.

According to another preferred embodiment of the invention, the main rib next to the recessed rib comprises several sipes extending perpendicular to the circumferential groove and being connected to the circumferential groove, wherein a radial extension of the sipes is less than 80% of the radial extension of the circumferential groove. Sipes are narrow grooves or incisions in the tread portion, being relatively small with respect to the main groove. Sipes provide improve traction in wet or icy conditions.

Further preferably not only the main rib can comprise additional grooves, i.e. the sipes, but also the recessed rib can comprise additional grooves. In this regard and according to a further preferred embodiment of the invention, an exterior surface of the recessed rib facing in the radial direction is a) bald, or
b) profiled and comprises alternating sections with varying radial height in the tire circumferential direction, or
c) profiled and comprises a trunk groove extending from the circumferential groove in a lateral direction towards the sidewall, wherein the trunk groove comprises a varying cross section in the lateral direction, or
d) a combination of b) and c).

With regard to b) the varying radial height prevent the shoulder rib from excessive wear during high-speed cornering and thus increases durability of the tire. Furthermore, having a trunk groove according to c) improves heat dissipation in the tire by channeling air flow which is also beneficial for the durability of the tire.

In a further aspect, the invention provides a wheel for a vehicle, preferably for a heavy goods vehicle, comprising a tire rim for being connected to an axle of the vehicle and the above-described tire mounted to the tire rim. Such a wheel has a higher durability and thus a longer lifetime.

In yet another aspect, the invention provides a tire mold for molding a tire, preferably the above-described tire, comprising at least a groove molding portion with a blade, wherein the blade protrudes from a tread molding portion for molding a tread portion that extends between a pair of shoulders of the tire, wherein the tread molding portion has an equatorial region for molding an equatorial region of the tread portion in between the pair of shoulders, wherein the groove molding portion molds a circumferential groove with a corresponding free space extending in the tire circumferential direction and a recessed rib, the recessed rib located on the side of the circumferential groove farther away from the equatorial region of the tread portion, wherein the blade of the groove molding portion has adjacent blade walls with a first blade wall facing away from the equatorial region of the tread molding portion and a second blade wall facing towards the equatorial region of the tread molding portion, wherein the second blade wall comprises a protruding portion protruding outwardly away from the equatorial region of the tread molding portion, the protruding portion comprising two diverging regions and in between the diverging regions a non-diverging region, wherein the diverging region on the second blade wall is non-parallel to the first blade wall, and wherein the non-diverging region on the second blade wall is essentially parallel to the first blade wall, and wherein a sum of a radial extension of the diverging regions is in between 25% to 45% of the radial extension of the protruding portion.

Blade preferably means a protrusion in the tire mold that forms a corresponding groove in the finished tire.

The tire mold and in particular the blade of the tire mold having a geometry such that in the diverging region the second blade wall is non-parallel to the first blade wall and in the non-diverging region in between the diverging regions the second blade wall is essentially parallel to the first blade wall, and such that the sum of the radial extension of the diverging regions is in between 25% to 45% of the radial extension of the protruding portion, has the advantage that when opening the mold the blade can be removed from the molded tire without the risk of damaging the groove walls with the blade as in the non-diverging region the second blade wall is essentially parallel to the first blade wall.

BRIEF DESCRIPTION OF THE DRAWINGS

The invention will now be described by way of example and with reference to the accompanying drawings in which:

FIG. 1 is a schematic view of a tread portion of a tire according to a preferred embodiment of the invention;

FIG. 2 is a perspective view of the tread portion of FIG. 1;

FIG. 3 is a perspective view of a circumferential groove in the tread portion of FIG. 1;

FIG. 4 is a sectional view of the groove of FIG. 3;

FIG. 5 is a sectional view of a tire according to a further embodiment of the invention;

FIG. 6 is a sectional view of the groove of FIG. 5;

FIGS. 7A-7D are schematic views of differently formed grooves, wherein FIG. 7C shows a groove according to an embodiment of the invention;

FIG. 8 is a simulation for the strain distribution within a tire according to an embodiment of the invention with a 2° slip angel;

FIG. 9 is a simulation for the strain distribution within a tire according to an embodiment of the invention with a 3° slip angel;

FIG. 10 is a simulation for the strain distribution within a comparative tire according to prior art with a 2° slip angel;

FIG. 11 is a simulation for the strain distribution within a comparative tire according to prior art with a 3° slip angel;

FIG. 12 is a groove design for the comparative tire according to prior art for which the simulation in FIGS. 10 and 11 was carried out.

DETAILED DESCRIPTION OF THE INVENTION

Hereinafter, preferred embodiments of the present invention will be described in detail with reference to the accompanying drawings, so as to assist those having ordinary skill in the art in a comprehensive understanding of the invention, and the present invention is not limited to the embodiments disclosed below. Referring to the drawings, wherein like reference signs designate like or corresponding parts throughout the several views.

FIGS. 1 and 2 show a tread portion 10 of a tire 12 for contacting the ground, according to a preferred embodiment of the invention. The tread portion 10 extends between a pair of shoulders 14 and has an equatorial region 16 in between the shoulders. In this embodiment the tread portion 10 comprises two main grooves 18 formed in the equatorial region 16 forming three main ribs 20. The tread portion 10 comprises next to the shoulder 14 at least one circumferential groove 22 forming a recessed rib 24, the recessed rib 24 located on the side of the circumferential groove 22 farther away from the equatorial region 16.

With reference to FIGS. 3 and 4, it can be seen that the groove 22 has adjacent groove walls 26, 28 with a first groove wall 26 facing away from the equatorial region 16 and a second groove wall 28 facing towards the equatorial region 16. The second groove wall 28 comprises a protruding portion 30 protruding outwardly away from the equatorial region 16. The protruding portion 30 comprising two diverging regions 32 and in between the diverging regions 32 a non-diverging region 34. In the diverging region 32 the second groove wall 28 is non-parallel to the first groove wall 26 and in the non-diverging region 34 the second groove wall 28 is essentially parallel to the first groove wall 26. Furthermore, the protruding portion 30 is formed such that a sum of a radial extension 36 of the diverging regions 32 is in between 25% to 45% of the radial extension 38 of the protruding portion 30. In this particular embodiment shown in FIGS. 1 to 4 the sum of the radial extension 36 of the diverging regions 32 is 31% of the radial extension 38 of the protruding portion 30.

Furthermore, as is best seen in FIG. 4, the radial extension 40 of the groove 22 is determined from an exterior surface 42 of the recessed rib 24 facing in the radial direction of the tire, along a shortest line towards the bottom of the groove 22 and corresponds to the depth of the groove 22 as well as to the radial extension 40 of the second groove wall 28. As can also be seen in FIG. 4, the radial extension 40 of the second groove wall 28 is less than a radial extension 44 of the first groove wall 26 determined from the tread surface 46 facing in the radial direction.

Furthermore, the sum of the radial extension 36 of diverging regions 32 together with the radial extension 48 of the non-diverging region 34 corresponds to the radial extension 38 of the protruding portion 30. Also, the first groove wall 26 is free of a protruding portion and is formed by an even plain.

A non-skid depth (NSD) of the tread portion 10 is defined by the depth of the grooves. If there are grooves of differing depths, the maximum groove depth will define the NSD of the tread portion. For the embodiment shown in FIGS. 1 to 4, the NSD is defined by the depth of the main grooves 18. The radial extension 40 of the groove 22 is in this embodiment 90% of the NSD. A heavy-duty tire 12 may have a NSD in the range of more than 12 mm to less than 19 mm. For this embodiment the NSD is 15.5 mm.

Furthermore, in this embodiment a width 37 of the groove 22 is 13% of a width 38 of the main groove 18, wherein the width 38 of the main groove 18 is determined at the surface of the tread portion 10. Furthermore, the recessed rib 24 compared to the main rib 18 is recessed 10% with respect to a radial extension 41 of the main groove 18.

FIG. 5 shows a sectional view of a tire 12 according to a further embodiment of the invention. The tire 12 is configured as Line Haul tire, having a Size of 295/75R22.5. The tire 12 illustrated in FIG. 1 comprises at its radial outer end the tread portion 10 for contacting the ground. The tire 12 is provided with a pair of bead portions 50 and further with a pair of opposing sidewall portions 52 which extend outwardly in the tire radial direction 54 from the respective bead portions 50 towards the pair of shoulders 14.

The tire 12 is provided with a carcass 56 which spans the distance between the cores of the pair of bead portions 50, and an inner liner 58 which is arranged at a location toward the interior from the carcass 56 and retains air pressure. The carcass 56 and the inner liner 58 are arranged in parallel fashion with respect to the inner circumferential surface of the tire 12 over a portion thereof that encompasses the bead portion 50, the sidewall portion 52, and the tread portion 10. The carcass 56 folds back upon itself and wraps around the bead portion 50 in order to envelop the bead portion 50. The tire 12 further comprises a reinforcing ply 60 being sandwiched between the tread portion 10 and the carcass 56.

The tread portion 10 is provided with a plurality of main grooves 18, in this embodiment two main grooves 18, forming three main ribs 20. The main grooves 18 extend in the tire circumferential direction. Each main groove 18 extends continuously in the tire circumferential direction. Similar to the embodiment shown in FIGS. 1 to 4, the tread portion 10 comprises next to the shoulder 14 a circumferential groove 22 forming a recessed rib 24, the recessed rib 24 located on the side of the circumferential groove 22 farther away from the equatorial region 16. With regard to the specific form of the groove 22, the groove 22 of the embodiment shown in FIG. 5 is depicted in FIG. 6 and has the same form as the groove 22 depicted in FIGS. 3 and 4.

In other words, the groove 22 has adjacent groove walls 26, 28 and the second groove wall 28 comprises a protruding portion 30. Furthermore, the protruding portion 30 comprises two diverging regions 32 and in between the diverging regions 32 a non-diverging region 34. The protruding portion 30 is formed such that the sum of the radial extension 36 of the diverging regions 32 is 31% of the radial extension 38 of the protruding portion 30. Furthermore, the recessed rib 24 has a radially outer width 62 and a radially inner width 64, and wherein the radially outer width 62 is greater than the radially inner width 64. Furthermore, the protruding portion 30 may be formed such that the sum of the radial extension 36 of the diverging regions 32 varies continuously along the circumferential extension of the groove 22 in the range between 25% and 45% of the radial extension 38 of the protruding portion 30.

In order to explain the effect of the specific form of the groove 22, having protruding portion 30 comprises two diverging regions 32 and in between the diverging regions 32 a non-diverging region 34, wherein the protruding portion 30 is formed such that the sum of the radial extension 36 of the diverging regions 34 is 25% to 45% of the radial extension 38 of the protruding portion 30, it is referred to FIGS. 7A-7D.

FIG. 7C shows a groove 22 according to a further embodiment of the invention. In this particular embodiment, the protruding portion 30 is formed such that the sum of the radial extension 36 of the diverging regions 32 is 45% of the radial extension 38 of the protruding portion 30. In FIGS. 7A, 7B and 7D groove 22' is formed differently such that the sum of the radial extension 36' of the diverging regions 32' is outside of 25% to 45% compared to the radial extension 38' of the protruding portion 30'. In FIG. 7A the form of the groove 22' is such that the sum of the radial extension 36' of the diverging regions 32' is 75% of the radial extension 38' of the protruding portion 30'; in FIG. 7B the form of the groove is such that the sum of the radial extension 36' of the diverging regions 32' is 55% of the radial extension 38' of the protruding portion 30', and in FIG. 7D the form of the groove 22' is such that the sum of the radial extension 36' of the diverging regions 32' is 15% of the radial extension 38' of the protruding portion 30'.

With regard to FIG. 7A where the sum of the radial extension 36' of the diverging regions 32' with regard to the radial extension 38' of the protruding portion 30' is too high, the sharp connection joint between the two diverging regions 32' leads to a high point load and causes high strain that affects the lifetime of the groove 22' negatively. With regard to FIG. 7B where the sum of the radial extension 36' of the diverging regions 32' with regard to the radial extension 38' of the protruding portion 30' is still too high, the form of the protruding portion 30' decreases the stability of the second groove wall 28' and thus creates an instability of the recessed rib 24'.

With regard to FIG. 7D where the sum of the radial extension 36' of the diverging regions 32' with regard to the radial extension 38' of the protruding portion 30' is too low, the sharp connection joint between the diverging region 32' and the bottom of the groove 22' leads to a high strain causing failure in the structural integrity and affecting the lifetime of the groove 22' negatively.

Example

An example of the present invention will be described below, but the present invention is not limited to the following example.

In this example, a simulation is carried out to illustrate the advantages of the invention in terms of strain distribution under cornering with a slip angel of 2° and 3°. For this the strain distribution for a tire 12 according to a preferred embodiment of the invention has been simulated. The tire 12 comprises next to the shoulder 14 a circumferential groove 22 forming a recessed rib 24. The groove 22 has the same form as shown in FIG. 6. As comparison the strain distribution for a prior art groove 22' shown in FIG. 12 has also been simulated.

FIG. 8 shows the strain distribution within the tire 12 under cornering with a slip angel of 2° and FIG. 9 with a slip angel of 3°. FIG. 10 shows the strain distribution within a tire according to prior art under cornering with a slip angel of 2° and FIG. 11 shows the strain distribution within the tire according to prior art under cornering with a slip angel of 3°.

With regard to FIG. 12 the groove 22' of the tire 12' of the prior art has a different geometry. As can be seen, the groove 22' according to the prior art has a protruding portion 30' at the bottom of groove 22'. However, the protruding portion 30' of the groove 22' is not formed such that a sum of a radial extension of the diverging regions is in between 25% to 45% of the radial extension of the protruding portion.

The simulations show, that the strain distribution at the groove base for a slip angel of 2° is less for the groove 22 according to the present invention compared to the prior art groove 22'. As can be seen by the numbers indicating the strain at the groove base, the groove 22 according to the present invention has for a slip angel of 2° a strain of 0.21 for both grooves 22. However, the prior art groove 22' has for a slip angel of 2° a strain of 0.25 for one groove 22' and of 0.23 for the other groove 22'. Furthermore, the strain on the shoulder 14—in particular the strain on the outer edge of the recessed rib 24—is less for the groove 22 according to the present invention compared to the prior art groove 22'.

REFERENCE SIGNS

10 tread portion
12 tire
14 shoulder
16 equatorial region
18 main groove
20 main rib
22 circumferential groove
24 recessed rib
26 first groove wall
28 second groove wall
30 protruding portion
32 diverging region
34 non-diverging region
36 radial extension of diverging region
37 with of circumferential groove
38 radial extension of protruding portion
39 width of main groove
40 radial extension of groove, radial extension of second groove wall
41 radial extension of main groove
42 exterior surface of recessed rib facing in radial direction
44 radial extension of first groove wall
46 tread surface facing in the radial direction

48 radial extension of non-diverging region
50 bead portion
52 sidewall portion
54 radial direction
56 carcass
58 inner liner
60 reinforcing ply
62 radially outer width
64 radially inner width

The invention claimed is:

1. A tire comprising a tread portion for contacting the ground and a pair of opposing sidewall portions, the tread portion extending between a pair of shoulders and having an equatorial region in between, the sidewall portions extending essentially in a radial direction from the shoulders, wherein the tread portion comprises next to the shoulder at least one circumferential groove extending from a groove bottom toward the tread portion, the circumferential groove forming a recessed rib, the recessed rib located on the side of the circumferential groove farther away from the equatorial region, the recessed rib has a radially outer width, wherein said circumferential groove has adjacent groove walls with a first groove wall facing away from the equatorial region and a second groove wall facing towards the equatorial region, wherein the second groove wall comprises a protruding portion protruding outwardly away from the equatorial region, the protruding portion comprising two linear diverging regions and in between the diverging regions a non-diverging region, wherein the diverging regions on the second groove wall are non-parallel to the first groove wall, wherein the non-diverging region on the second groove wall is parallel to the first groove wall, the recessed rib has a radially inner width at the non-diverging region, wherein a form of a bottom of the groove comprises a semicircle arc that transitions to one of the linear diverging regions, wherein the recessed rib has a groove bottom width at the groove bottom, the radially inner width being less than both the radially outer width and the groove bottom width to change a concentration of strain magnitude at the groove bottom, wherein a sum of a radial extension of the diverging regions is between 25% to 45% of the radial extension of the protruding portion, wherein the protruding portion is only present on the recessed rib.

2. The tire according to claim 1, wherein a surface area of the first groove wall is less than a surface area of the second groove wall.

3. The tire according to claim 1, wherein a direction of radial extension of the groove is parallel to the lateral outer surface of the recessed rib facing away from the equatorial region.

4. The tire according to claim 1, wherein the radial extension of the protruding portion is in between 50% to 70% of the radial extension of the second groove wall.

5. The tire according to claim 1, wherein the protruding portion a) starts at a radial position of 30% to 50% of the radial extension of the second groove wall, or b) ends at a radial position of 80% to 100% of the second groove wall, or c) a combination of a) and b).

6. The tire according to claim 1, wherein the tread portion comprises at least one main groove next to the circumferential groove, forming a main rib located on the side of the circumferential groove closer to the equatorial region.

7. The tire according to claim 6, wherein the main rib next to the recessed rib comprises several sipes extending perpendicular to the circumferential groove and being connected to the circumferential groove, wherein a radial extension of the several sipes is less than 80% of the radial extension of the circumferential groove.

8. The tire according to claim 1, wherein an exterior surface of the recessed rib facing in the radial direction is a) bald, or b) profiled and comprises alternating sections with varying radial height in the tire circumferential direction, or c) profiled and comprises a trunk groove extending from the circumferential groove in a lateral direction towards the sidewall, wherein the trunk groove comprises a varying cross section in the lateral direction, or d) a combination of b) and c).

9. The tire according to claim 1, wherein the second groove wall has a first portion on a first side of the protruding portion and a second portion on a second side of the protruding portion, wherein a first width of the groove at the first portion of the second groove wall and a second width of the groove at the second portion of the groove wall are the same.

10. A wheel for a vehicle comprising a tire rim for being connected to an axle of the vehicle and a tire according to claim 1 mounted to the tire rim.

11. A tire mold for molding a tire according to claim 1, comprising at least a groove molding portion with a blade, wherein the blade protrudes from a tread molding portion for molding a tread portion that extends between a pair of shoulders of the tire, wherein the tread molding portion has an equatorial region for molding an equatorial region of the tread portion in between the pair of shoulders, wherein the groove molding portion molds a circumferential groove with a corresponding free space extending in the tire circumferential direction and a recessed rib, the recessed rib located on the side of the circumferential groove farther away from the equatorial region of the tread portion, wherein the blade of the groove molding portion has adjacent blade walls with a first blade wall facing away from the equatorial region of the tread molding portion and a second blade wall facing towards the equatorial region of the tread molding portion, wherein the second blade wall comprises a protruding portion protruding outwardly away from the equatorial region of the tread molding portion, the protruding portion comprising two diverging regions and in between the diverging regions a non-diverging region, wherein the diverging region on the second blade wall is non-parallel to the first blade wall, and wherein the non-diverging region on the second blade wall is parallel to the first blade wall, and wherein a sum of a radial extension of the diverging regions is in between 25% to 45% of the radial extension of the protruding portion.

* * * * *